(12) United States Patent
Fletcher et al.

(10) Patent No.: US 7,688,850 B2
(45) Date of Patent: Mar. 30, 2010

(54) MEDIA INDEPENDENT OUT-OF OFFICE MANAGER

(75) Inventors: Ronald Lee Fletcher, Jackson, NJ (US); Srinivasa R. Gumbula, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 649 days.

(21) Appl. No.: 11/559,696

(22) Filed: Nov. 14, 2006

(65) Prior Publication Data

US 2008/0112546 A1    May 15, 2008

(51) Int. Cl.
*H04J 3/16* (2006.01)
(52) U.S. Cl. .................................... 370/466
(58) Field of Classification Search ........... 370/466, 370/467, 351, 356, 522, 352, 902; 379/88.05, 379/220.01, 93.31, 93.32; 709/230, 228, 709/227, 204, 206
See application file for complete search history.

(56) References Cited

U.S. PATENT DOCUMENTS 7,469,299 B2 * 12/2008 Johnston ..................... 709/237
7,475,109 B1 * 1/2009 Fletcher et al. ............. 709/204
7,496,945 B2 * 2/2009 Rodriguez .................... 725/51

* cited by examiner

*Primary Examiner*—Chi H Pham
*Assistant Examiner*—Alexander Boakye
(74) *Attorney, Agent, or Firm*—DeMont & Breyer, LLC (57) ABSTRACT

A method is disclosed that enables a user to set their "away" or auto-reply messages for two or more communications services (e.g., e-mail, voice mail, etc.) in one action. Separate actions are required in the prior art to change each outgoing message for every distinct communication service. The illustrative embodiment of the present invention is a method that enables a user to change the auto-reply message for multiple communication services with less effort than was required for multiple services in the prior art. In accordance with the illustrative embodiment, a text auto-reply message intended for e-mail is automatically converted into an abbreviated form for instant messaging and wireless text services and into audio for services like telephony. Furthermore, the illustrative embodiment enables the automatic translation of messages into different natural languages, and can apply rules so that the resulting messages are used appropriately.

16 Claims, 5 Drawing Sheets

MEDIA INDEPENDENT OUT-OF OFFICE MANAGER

FIELD OF THE INVENTION

The present invention relates to telecommunications in general, and, more particularly, to user interfaces.

BACKGROUND OF THE INVENTION

Modern telecommunications are responsible for the phrase "the world is getting smaller every day". The technology of personal communications is so pervasive that a given person, especially in business, is expected to be in touch at all times during the day. One service that makes such contact possible is voice mail, which sends an outgoing message to callers when an incoming telephone call goes unanswered. A person using this service, or a telephone answering machine, can change the outgoing message whenever desired to better inform their callers of their schedule or current whereabouts. Frequently, however, these messages are left unchanged, only asking callers to leave a message.

SUMMARY OF THE INVENTION

The present invention enables a user to set their "away" or auto-reply messages for two or more communications services (e.g., e-mail, voice mail, etc.) in one action. Separate actions are required in the prior art to change each outgoing message for every distinct communication service. For example, when a user leaves the office for vacation, the user would type at least one auto-response message for his or her e-mail and would separately record an away message for his or her telephone voice mail.

The illustrative embodiment of the present invention is a method that enables a user to change the auto-reply message for multiple communication services with less effort than was required for multiple services in the prior art.

In accordance with the illustrative embodiment, a text auto-reply message intended for e-mail is automatically converted into an abbreviated form for instant messaging and wireless text services and into audio for services like telephony. Furthermore, the illustrative embodiment enables the automatic translation of messages into different natural languages, and can apply rules so that the resulting messages are used appropriately.

Rules may also be set up, and selected between such that different outgoing messages are transmitted in different circumstances without additional user interaction. One such rule might be to use alternate, semantically distinct, pre-generated voice and text messages after 5:00 PM when the user normally goes home. The illustrative embodiment allows rules based on the identity of the caller providing for well targeted messages, telling a customer that his order has been received while asking unknown callers to leave a message.

The illustrative embodiment comprises a method comprising: (a) receiving a first payload message; (b) generating a second payload message in response to the receipt of said first payload message, wherein said second payload message comprises at least a portion of the semantic content of said first payload message; (c) transmitting a first auto-reply message comprising said first payload message in response to a first request to communicate with a user; and (d) transmitting a second auto-reply message comprising said second payload message in response to a second request to communicate with said user.

DETAILED DESCRIPTION

Figure 1:
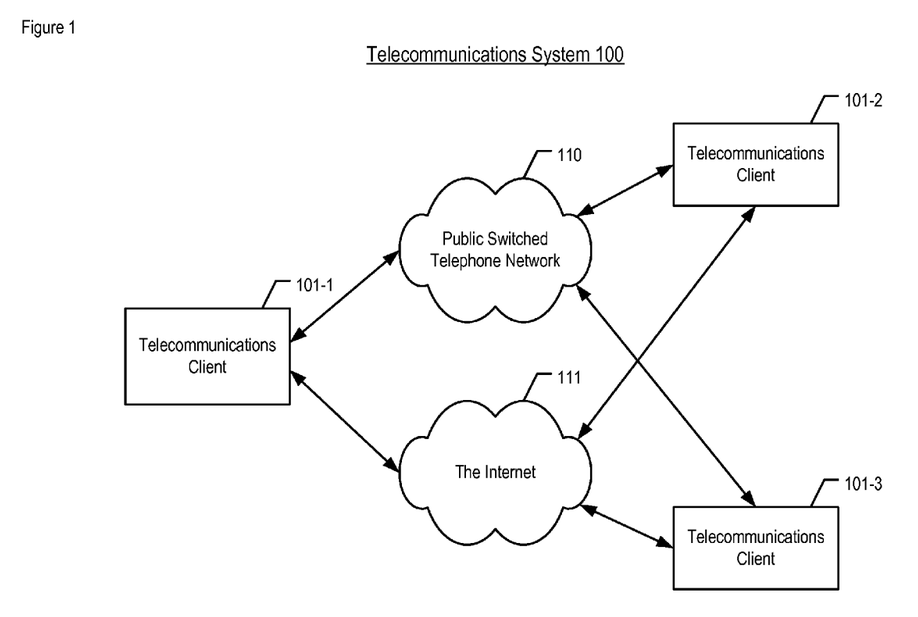
FIG. 1 depicts a schematic diagram of the salient components of telecommunications system 100 in accordance with the illustrative embodiment of the present invention.

FIG. 1 depicts a schematic diagram of the salient components of telecommunication system 100 in accordance with the illustrative embodiment of the present invention. Telecommunications system 100 comprises: telecommunications clients 101-1, 101-2, and 101-3, Public Switched Telephone Network (PSTN) 110, and the Internet 111, interconnected as shown. Although the illustrative embodiment comprises three telecommunications clients, it will be clear to those skilled in the art, after reading this disclosure, how to make and use alternative embodiments of the present invention that comprise any number of telecommunications clients. Furthermore, although the illustrative embodiment comprises identical telecommunications clients, it will be clear to those skilled in the art, after reading this disclosure, how to make and use embodiments of the present invention in which not all of the telecommunications clients are identical.

Furthermore, although the illustrative embodiment comprises the Public Switched Telephone Network and the Internet, it will be clear to those skilled in the art, after reading this disclosure, how to make and use alternative embodiments of the present invention that comprise:

i. the Public Switched Telephone Network, or
  ii. the Internet, or
  iii. one or more other telecommunications networks, or
  iv. any combination of i, ii, and iii.

In accordance with the illustrative embodiment, telecommunications client 101-i, wherein i∈{1, 2, 3}, is a telecommunications terminal that is capable of performing the functionality described below and in the accompanying figures. In particular, telecommunications client 101-i provides:

i. bi-directional audio service via a first protocol (e.g., tip-ring, DS0, ISDN, etc.) and the PSTN, and
  ii. bi-directional data service via a second protocol (e.g., the Basic Instant Messaging Protocol, etc.) and the Internet.

It will be clear to those skilled in the art, after reading this disclosure, how to make and use alternative embodiments of the present invention in which telecommunications client 101-i provides:

i. uni-directional audio service (e.g., voice paging, etc.), or
  ii. bi-directional audio service (e.g., telephone, etc.), or
  iii. uni-directional data service (e.g., e-mail, etc.), or
  iv. bi-directional data service (e.g., http, instant messaging, etc.), or
  v. uni-directional video service (e.g., streaming video, etc.), or vi. bi-directional video service (e.g., video conferencing, etc.), or vii. any combination of i, ii, iii, iv, v, and vi via any number of networks and any number of protocols. Furthermore, it will be clear to those skilled in the art, after reading this disclosure, how to make and use alternative embodiments of the present invention in which telecommunications client 101-i comprises a system that comprises a switch. The details of how to make and use telecommunications client 101-i are provided in detail below and in the accompanying drawings.

Public Switched Telephone Network 110 is the public telephone network. It will be clear to those skilled in the art how to make and use Public Switched Telephone Network 110.

The Internet 111 is the global packet switched network that is well known in the art. It will be clear to those skilled in the art how to make and use the Internet 111.

Figure 2:
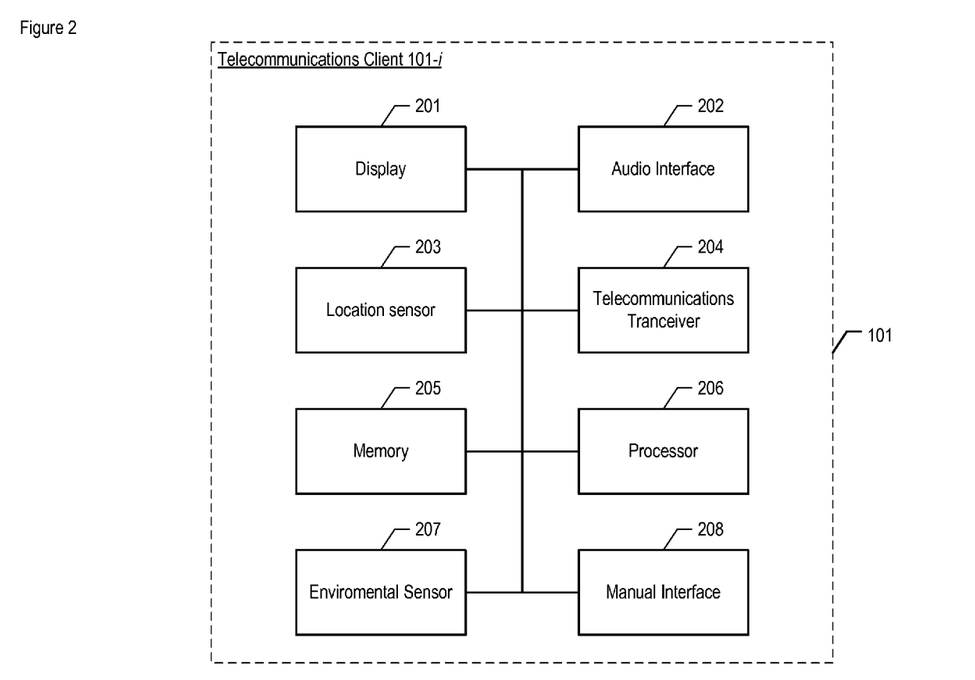
FIG. 2 depicts a block diagram of the salient components of telecommunications client 101-i in accordance with the illustrative embodiment of the present invention.

FIG. 2 is a block diagram of the salient components of telecommunications client 101-i in accordance with the illustrative embodiment of the present invention, which are interrelated as shown. In accordance with the illustrative embodiment, telecommunications client 101-i comprises:

i. display 201, and ii. audio interface 202, and iii. location sensor 203, and iv. telecommunications transceiver 204, and v. memory 205, and vi. processor 206, and vii. environmental sensor 207, and viii. manual interface 208.

It will be clear to those skilled in the art, after reading this disclosure, how to make and use alternative embodiments of the present invention in which telecommunications client 101-i comprises any subcombination of i, ii, iii, iv, v, vi, vii, and vii.

Display 201 is a liquid crystal display that presents the user of telecommunications client 101-i with a visual representation of data, in well-known fashion. It will be clear to those skilled in the art how to make and use alternative embodiments of the present invention in which display 201 is other than a liquid crystal display.

Audio interface 202 is a microphone and speaker that provides sound to the user and that receives sound from the user. It will be clear to those skilled on the art how to make and use audio interface 202.

Location sensor 203 is a Global Positioning System (GPS) receiver that is capable of determining the location of telecommunications terminal 101-i in well-known fashion. It will be clear to those skilled in the art, after reading this disclosure, how to make and use alternative embodiments of the present invention in which location sensor 203 is another means for determining the location of telecommunications terminal 101-i.

Telecommunications transceiver 204 is an interface to Public Switched Telephone Network 110 and the Internet 111 in well-known fashion. It will be clear to those skilled in the art how to make and use alternative embodiments in which telecommunications transceiver 204 works with any network.

Memory 205 is a non-volatile memory that provides storage for telecommunications terminal 101-i in well-known fashion. It will be clear to those skilled in the art, after reading this disclosure, how to make and use alternative embodiments of the present invention in which memory 205 comprises a different memory type.

Processor 206 is a general-purpose processor that performs the tasks described in detail below and in the accompanying figures. It will be clear to those skilled in the art how to make and use processor 206.

Environmental sensor 207 is a sensing apparatus providing environmental measurements of the local environment of telecommunications client 101-i. In the illustrative embodiment environmental sensor 207 is a light level sensor for measuring ambient light levels. It will be clear to those skilled in the art after reading this disclosure that environmental sensor 207 could instead be any combination of sensing devices, including thermometers, hygrometers, accelerometers, blood pressure sensors, pulse rate sensors, brain wave detectors, etc. It will be clear to those skilled in the art how to make and use environmental sensor 207.

Manual interface 208 is a tactile data input device (i.e. multiple pushbuttons) for telecommunications client 101-i. It will be clear to those skilled in the art, after reading this disclosure, how to make and use alternative embodiments in which manual interface 208 is a touch sensitive screen of display 201, external wireless keypad, or some other mechanism capable of accepting input from the user. It will be clear to those skilled in the art how to make and use manual interface 208.

Figure 3:
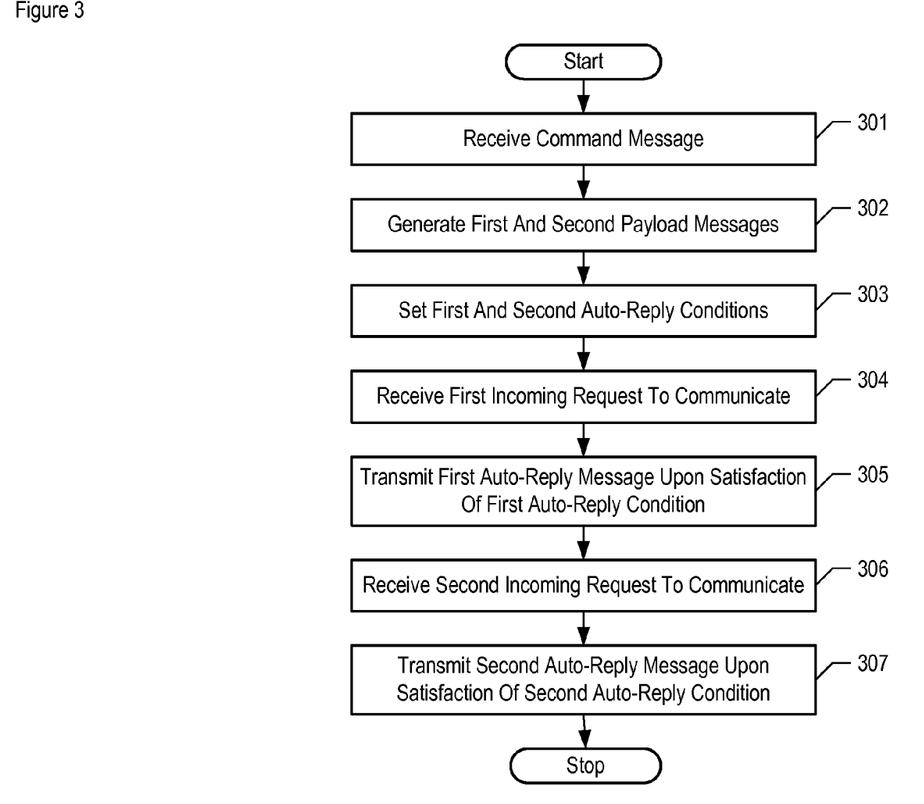
FIG. 3 depicts a flowchart of the salient tasks performed by the illustrative embodiment of the present invention.

FIG. 3 depicts a flowchart of the salient tasks performed in accordance with the illustrative embodiment of the present invention.

At task 301, telecommunications client 101-1 receives a command message, which instructs telecommunications client 101-1 to set or change its auto-reply behavior. In accordance with the illustrative embodiment, the command message is entered into telecommunications client 101-1 by the user of telecommunications client 101-1 through a command-line interface. In accordance with the illustrative embodiment, the command message comprises a string that specifies all of the parameters affecting the auto-reply behavior, but it will be clear to those skilled in the art, after reading this disclosure, how to make and use alternative embodiments of the present invention in which the command message is input through a graphical-user interface. An example of three illustrative command messages is shown in Table 1 below.

TABLE 1

Illustrative Auto-Reply Messages and Conditions

| Command Message | Respond To Whom | Time Condition | Applicable to Which Services | Reply Message |
|---|---|---|---|---|
| #1 | All | 1 PM-7 AM | All | "Please contact Sally at this time" |
| #2 | Spouse | Today, once | All | "Let's go out for pizza tonight" |
| #3 | French Co-workers | 3 PM-4 PM | Telephone | "Sortons pour la pizza ce soir" |

It will be clear to those skilled in the art, after reading this disclosure, how to make and use embodiments of the present invention that accomplish task 301.

At task 302, a first auto-reply message and a second auto-reply message are generated based on the command message received at task 301. The details of task 302 are described below and in the accompanying figures.

At task 303, the first and second auto-reply conditions of telecommunications client 101-1 are set based on the command message received at task 301. The auto-reply conditions dictate the circumstances in which the first auto-reply message and the second auto-reply message are to be sent. In accordance with the illustrative embodiment, the first and second auto-replay conditions are based on:
  i. the receipt of a request to communicate with the user of telecommunications client 101-1, and
  ii. the calendrical time, and
  iii. the geo-location of telecommunications client 101-1, and
  iv. the identity of the caller from the incoming communications request, and
  v. the environmental conditions measured by environmental sensor 207, and
  vi. the physiological state of the user of telecommunications client 101-1, and
  vii. the status of the telecommunication networks available to telecommunications client 101-1.

It will be clear to those skilled in the art, after reading this disclosure, how to make and use alternative embodiments of the present invention in which the first and second auto-reply conditions are based on any sub-combination of i, ii, iii, iv, v, vi, and vii. It will be clear to those skilled in the art, after reading this disclosure, how to make and use embodiments of the present invention which accomplish task 303.

At task 304, telecommunications client 101-1 receives a first request to communicate via a first service, via a first protocol, a first natural language, and a first network from Bob, the user of terminal 101-2 (e.g., a 9:00 AM telephone call in English via tip-ring and the PSTN, etc.). It will be clear to those skilled in the art, after reading this disclosure, how to make and use alternative embodiments in which the first request arrives at any time, in any language, in any protocol, via any service, over any network, and from any sender.

At task 305, telecommunications client 101-1 transmits a first auto-reply message in response to the satisfaction of the first auto-reply condition, which includes the receipt of the first request to communicate received at task 305. In accordance with the illustrative embodiment, the first auto-reply message is transmitted via the first service, the first protocol, the first natural language, and the first network (e.g., a 9:01 AM telephone call in English via tip-ring and the PSTN, etc.). However, it will be clear to those skilled in the art, after reading this disclosure, how to make and use alternative embodiments of the present invention in which the first auto-reply message is transmitted using:
  i. a different service than the first service (e.g., a second service, etc.), or
  ii. a different protocol than the first protocol (e.g., a second protocol, etc.), or
  iii. a different network than the first network (e.g., a second network, etc.), or
  iv. a different natural language than the first natural language (e.g., a second natural language, etc.), or
  v. any combination of i, ii, iii, and iv.

It will be clear to those skilled in the art how to make and use embodiments of the present invention which accomplish task 305.

At task 306, telecommunications client 101-1 receives a second request to communicate for a second service via a second protocol, a second natural language, and a second network (e.g., a 9:30 AM instant message in French via TCP/IP and the Internet, etc.). It will be clear to those skilled in the art, after reading this disclosure, how to make and use alternative embodiments in which the second request arrives at any time, in any language, in any protocol, over any network, and is from any sender.

At task 307, a second auto-reply message is transmitted in response to the satisfaction of the second auto-reply condition, which includes the receipt of the second request to communicate received at task 306. In accordance with the illustrative embodiment, the second auto-reply message is transmitted via the second service, the second protocol, the second natural language, and the second network (e.g., a 9:31 AM instant message in French via TCP/IP and the Internet, etc.). However, it will be clear to those skilled in the art, after reading this disclosure, how to make and use alternative embodiments of the present invention in which the second auto-reply message is transmitted using:
  i. a different service than the second service (e.g., the first service, etc.), or
  ii. a different protocol than the second protocol (e.g., the first protocol, etc.), or
  iii. a different network than the second network (e.g., the first network, etc.), or
  iv. a different natural language than the second natural language (e.g., the first natural language, etc.), or
  v. any combination of i, ii, iii, and iv.

It will be clear to those skilled in the art how to make and use embodiments of the present invention which accomplish task 307.

Figure 4:
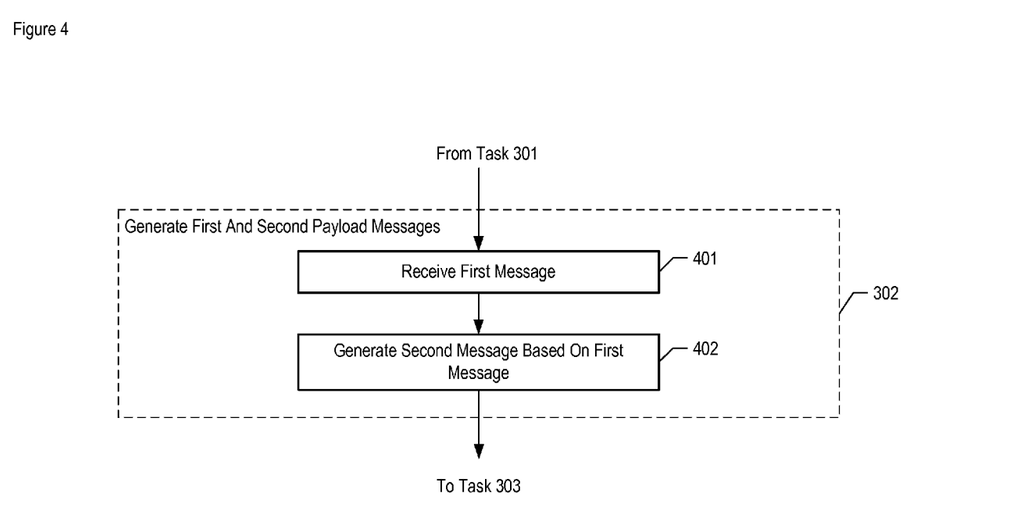
FIG. 4 depicts a flowchart of the salient tasks performed by the illustrative embodiment in accomplishing task 302.

FIG. 4 depicts a flowchart of the salient tasks performed by the illustrative embodiment of the present invention in accomplishing task 302.

At task 401 the command message is received from the user, which comprises the first payload message. In accordance with the illustrative embodiment the first payload message is text, but it will be clear to those skilled in the art, after reading this specification, how to make and use embodiments of the present invention in which the first payload message is audio or video with audio. It will be clear to those skilled in the art how to make and use embodiments of the present invention which accomplish task 401.

At task 402 the second payload message is generated based on the first payload message from task 401. In accordance with the illustrative embodiment the second payload message is audio and comprises at least a portion of the semantic content of the first payload message, but is of a different message type or a different natural language, or both a different message type and a different natural language. It will be clear to those skilled in the art how to make and use embodiments of the present invention which accomplish task 402.

Figure 5:
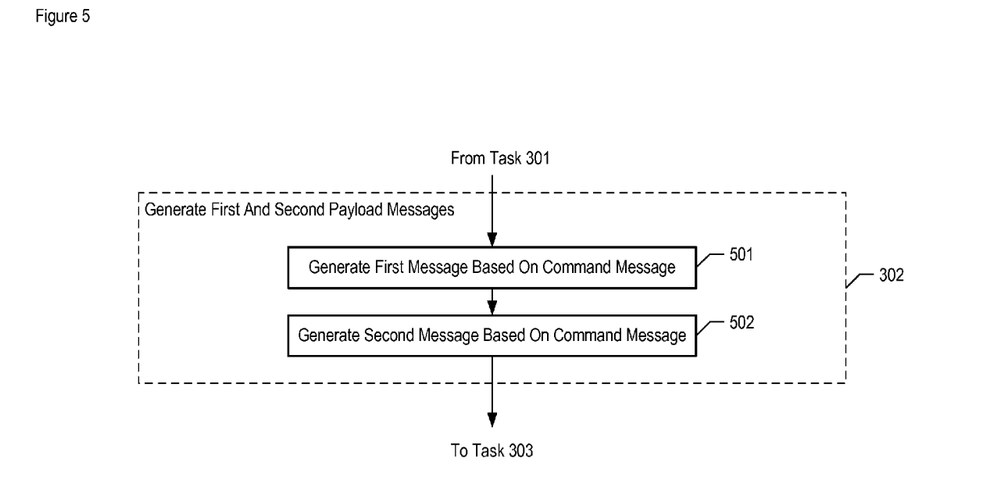
FIG. 5 depicts a flowchart of the salient tasks performed by an alternative embodiment of the present invention in accomplishing task 302.

FIG. 5 depicts a flowchart of the salient tasks performed by some alternative embodiments of the present invention in accomplishing task 302.

At task 501 a first payload message is generated based on the command message received at task 301. In accordance with the illustrative embodiment the first payload message comprises at least a portion of the semantic content of the command message and in the same message type and natural language as in the command language. It will be clear to those skilled in the art how to make and use embodiments of the present invention which accomplish task 501.

At task 502 a second payload message is generated based on the command message received at task 301. In accordance with the illustrative embodiment the second payload message comprises at least a portion of the semantic content of the command message, but in a different message type or a different natural language, or both a different message type and a different natural language than the first payload message. It will be clear to those skilled in the art how to make and use embodiments of the present invention which accomplish task 502.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, tasks, etc.

What is claimed is:

1. A method comprising:
   (a) receiving a first payload message;
   (b) generating a second payload message in response to the receipt of said first payload message, wherein said second payload message comprises at least a portion of the semantic content of said first payload message;
   (c) transmitting via a first protocol, in response to a first request to communicate with a user, a first auto-reply message that comprises said first payload message; and
   (d) transmitting via a second protocol, in response to a second request to communicate with said user, a second auto-reply message that comprises said second payload message.

2. A method comprising:
   (a) receiving a first payload message;
   (b) generating a second payload message in response to the receipt of said first payload message, wherein said second payload message comprising at least a portion of the semantic content of said first payload message;
   (c) transmitting via a first telecommunications network, in response to a first request to communicate with a user, a first auto-reply message that comprising said first payload message; and
   (d) transmitting via a second telecommunications network, in response to a second request to communicate with said user, a second auto-reply message that comprises said second payload message.

3. A method comprising:
   (a) receiving a command message;
   (b) generating a first payload message, a second payload message, a first auto-reply condition, and a second auto-reply condition in response to the receipt of said command message from said user, wherein said first payload message is different than said second payload message, and wherein said first auto-reply condition is different than said second auto-reply condition;
   (c) transmitting a first auto-reply message comprising said first payload message in response to the satisfaction of said first auto-reply condition, wherein said first auto-reply condition requires for satisfaction a first request to communicate with a user; and
   (d) transmitting a second auto-reply message comprising said second payload message in response to the satisfaction of said second auto-reply condition, wherein said second auto-reply condition requires for satisfaction a second request to communicate with said user.

4. The method of claim 3:
   wherein said first auto-reply message is transmitted via a first protocol; and
   wherein said second auto-reply message is transmitted via a second protocol that is different from said first protocol.

5. The method of claim 3:
   wherein said first payload message is in a first natural language; and
   wherein said second payload message is in a second natural language that is different from said first natural language.

6. The method of claim 3:
   wherein said first auto-reply message is transmitted in accordance with a first service; and
   wherein said second auto-reply message is transmitted in accordance with a second service that is different from said first service.

7. The method of claim 6 wherein said first service is bi-directional audio and second service is bi-directional data.

8. The method of claim 3:
   wherein said first auto-reply message is transmitted via a first telecommunications network; and
   wherein said second auto-reply message is transmitted via a second telecommunications network that is different than said first telecommunications network.

9. The method of claim 3:
   wherein said first auto-reply condition also requires for satisfaction that said first communications request comprises a first source identification; and
   wherein said second auto-reply condition also requires for satisfaction that said second communications request comprises a second source identification that is different from said first source identification.

10. The method of claim 3:
    wherein said first auto-reply condition also requires for satisfaction a first relation comprising the calendrical time;
    wherein said second auto-reply condition also requires for satisfaction a second relation comprising the calendrical time; and
    wherein said second relation is different from said first relation.

11. The method of claim 3:
    wherein said first auto-reply condition also requires for satisfaction a first environmental measurement; and
    wherein said second auto-reply condition also requires for satisfaction a second environmental measurement that is different from said first environmental measurement.

12. The method of claim 3:
    wherein said first auto-reply condition also requires for satisfaction a first location; and
    wherein said second auto-reply condition also requires for satisfaction a second location that is different from said first location.

13. A method comprising:
    (a) receiving a first payload message that is in a first natural language;
    (b) generating a second payload message that is in a second natural language in response to the receipt of said first payload message, wherein said second natural language is different than said first natural language, and wherein said second payload message comprises at least a portion of the semantic content of said first payload message;
    (c) transmitting a first auto-reply message comprising said first payload message in response to a first request to communicate with a user; and
    (d) transmitting a second auto-reply message comprising said second payload message in response to a second request to communicate with said user.

14. The method of claim 13:
    wherein said first auto-reply message is transmitted via a first protocol; and wherein said second auto-reply message is transmitted via a second protocol that is different than said first protocol.

15. The method of claim 13:
wherein said first auto-reply message is transmitted via a first telecommunications network; and
wherein said second auto-reply message is transmitted via a second telecommunications network that is different than said first telecommunications network.

16. The method of claim 15:
wherein said first payload message is transmitted in accordance with a first service; and
wherein said second payload message is transmitted in accordance with a second service that is different from said first service.

* * * * *